UNITED STATES PATENT OFFICE.

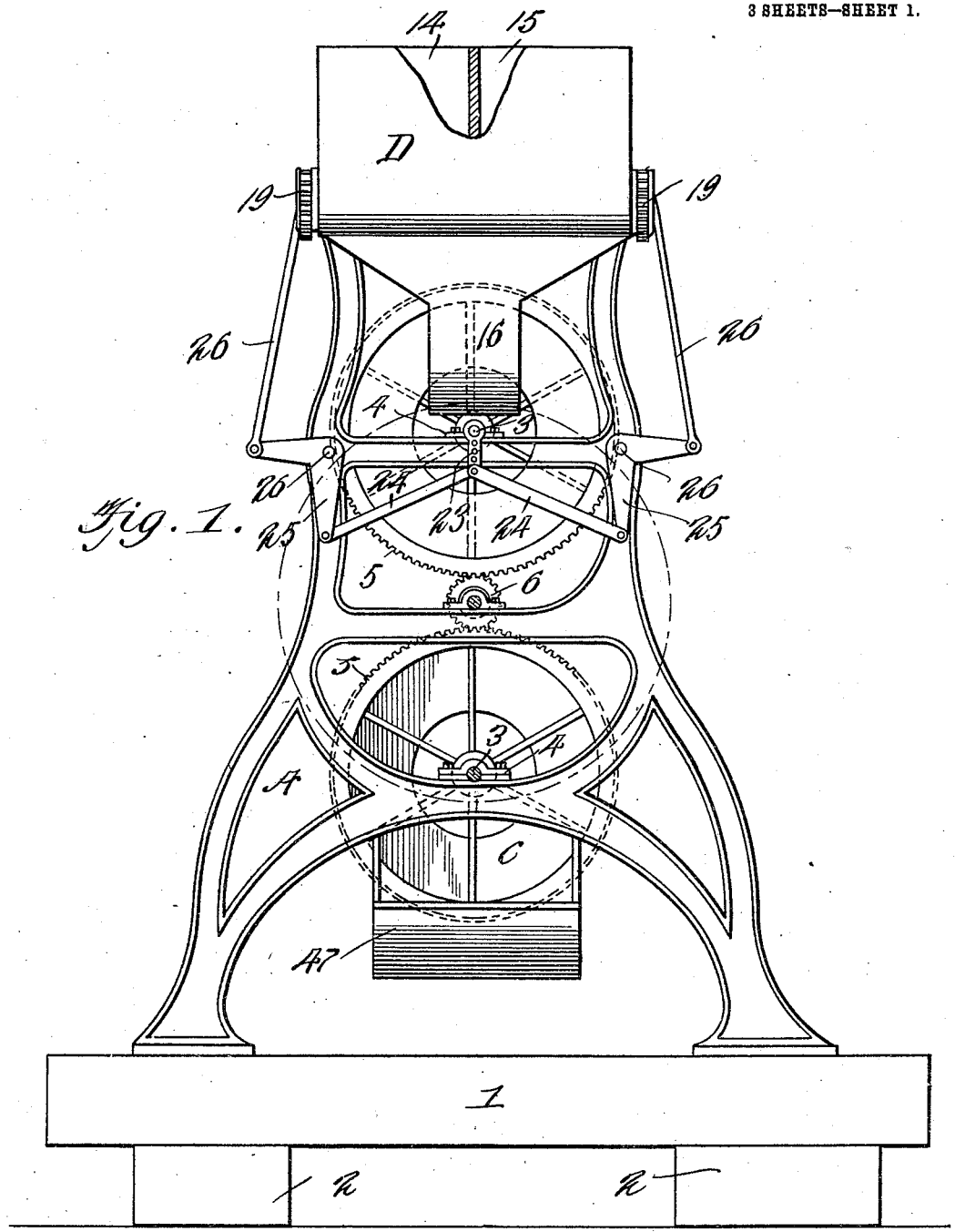

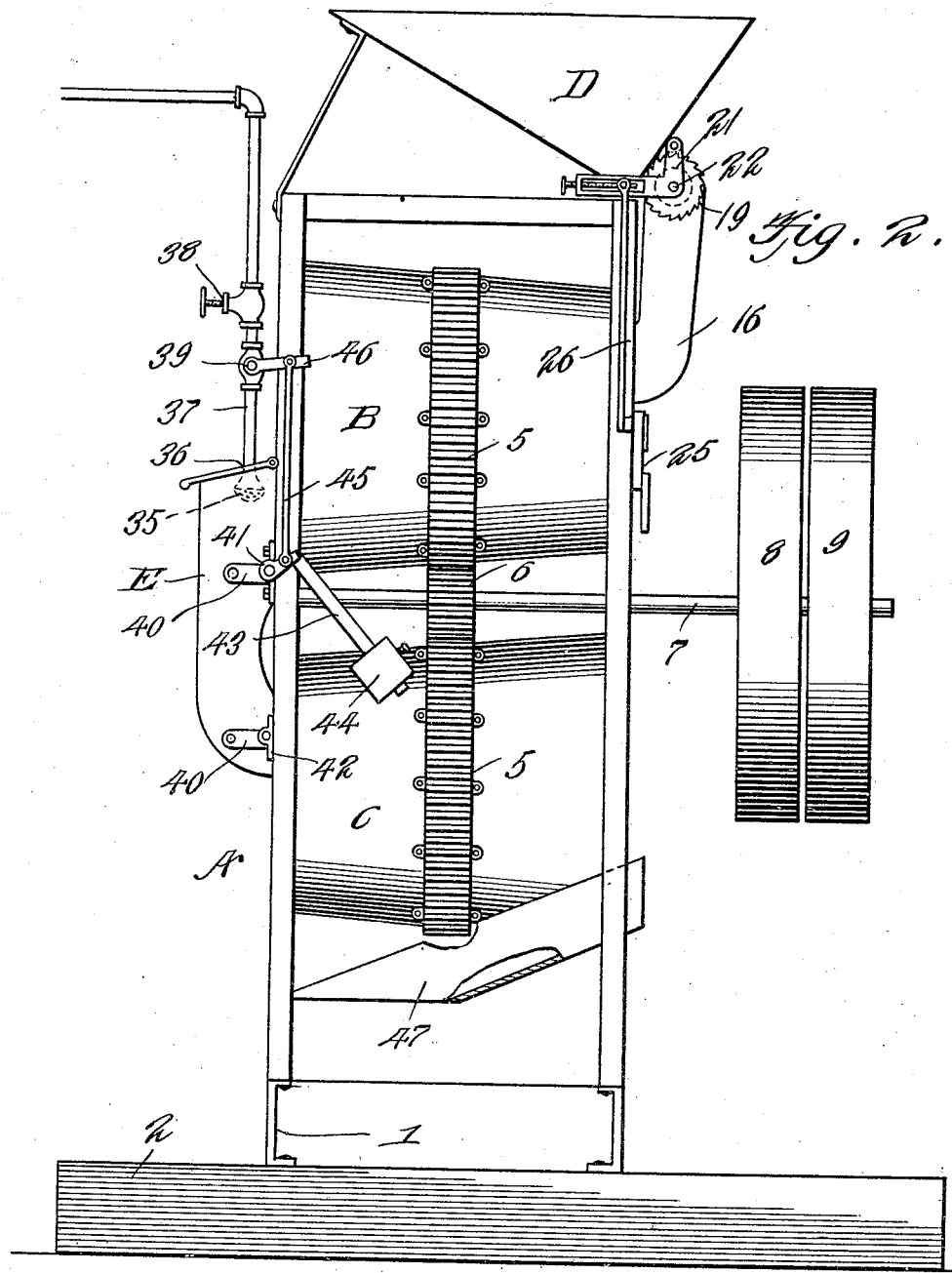

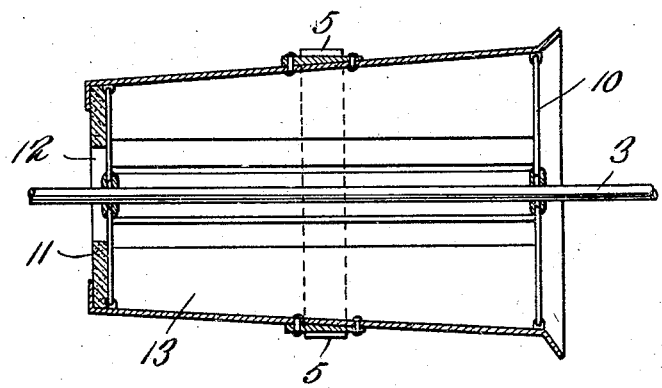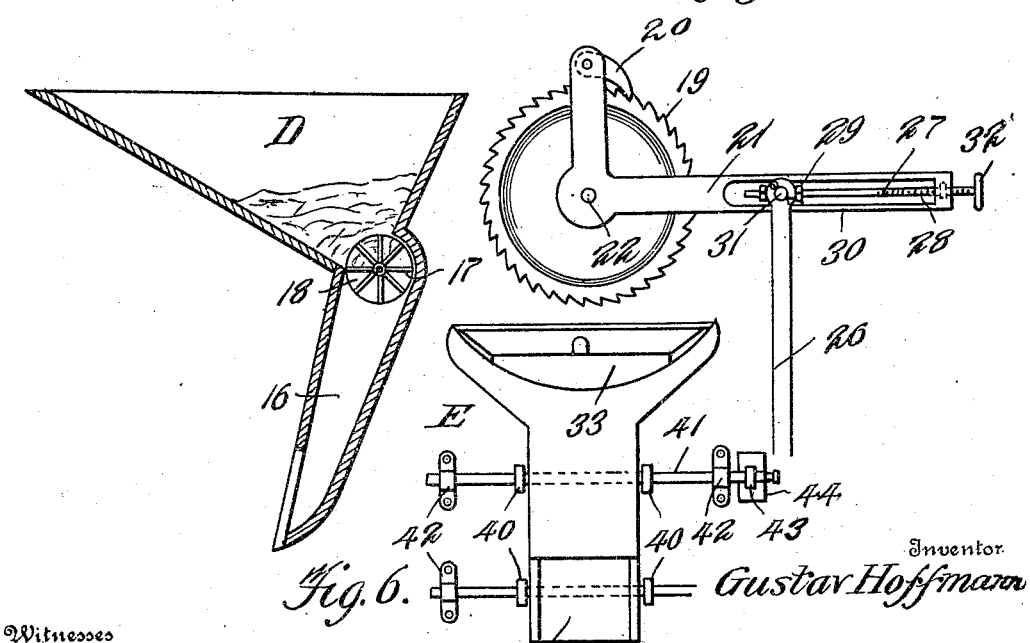

GUSTAV HOFFMANN, OF ST. PAUL, MINNESOTA.

MIXING-MACHINE.

956,351. Specification of Letters Patent. Patented Apr. 26, 1910.

Application filed July 9, 1909. Serial No. 506,826.

*To all whom it may concern:*

Be it known that I, GUSTAV HOFFMANN, a citizen of the United States, residing at St. Paul, in the county of Ramsey and State of Minnesota, have invented new and useful Improvements in Mixing-Machines, of which the following is a specification.

This invention relates to mixing machines, and more particularly to a machine for automatically feeding the materials in proper proportion, the mixing and moistening the material and supplying the materials when thoroughly mixed and moistened to a suitable mold or molds wherein the material may be formed into plain or fancy blocks, bricks or tiles.

The invention has for one of its objects the provision of a plurality of mixing drums into the upper one of which the materials to be mixed are supplied, and between the drums is a controlling device for supplying water to the materials to produce the proper consistency when the material is further mixed in the second drum.

A further object of the invention is to provide means whereby the supply of water will be regulated in accordance with the amount of material feeding from one drum to the other, so that substantial uniform consistency of the mixed material can be maintained.

With these objects in view and others, as will appear as the description proceeds the invention comprises the various novel features of construction and arrangement of parts which will be more fully described hereinafter and set forth with particularity to the claims appended hereto.

In the accompanying drawings, which illustrate one embodiment of the invention, Figure 1 is a front view of the machine with a portion of the bin or hopper broken away. Fig. 2 is a front elevation of the machine. Fig. 3 is a longitudinal sectional view of one of the mixing drums. Fig. 4 is a detail sectional view of the hopper and the chute connected therewith. Fig. 5 is a detail view of the means for adjusting the feed of the raw material from the hopper or bin to the first drum. Fig. 6 is an elevation of the chute between the two mixing drums.

In the accompanying drawings A designates the frame of the machine which is mounted on a bed consisting of parallel beams 1 supported upon cross pieces 2. The frame A is of any approved construction and arranged therein are rotary drums B and C disposed one above the other and each provided with a central shaft 3 journaled in bearings 4 upon the frame A. Each drum is provided with an annular gear 5 extending around the same at the middle and meshing with both gears is a pinion 6 secured to the main driving shaft 7 which is journaled on the frame A at a point between the two drums, one end of the shaft being extended and provided with loose and tight pulleys 8 and 9, whereby the shaft may be driven from any source of power through the medium of a belt, not shown. Obviously, any other suitable driving arrangement may be employed for rotating the drums simultaneously.

The drums B and C are substantially the same in construction and arrangement, except that the latter drum is reversely arranged with respect to the former. As shown in Fig. 3, each drum is constructed of sheet metal and is of slightly tapered form, so that the material will be gradually conducted from the smaller to the larger end as the drum rotates. The larger end 10 is entirely open to permit the mixed material to work out, while the smaller end is partially closed by a head 11 that is provided with a central opening 12, through which the material to be mixed is delivered. The mixing is facilitated by a plurality of longitudinally extending vanes or ribs 13 which are rigidly secured in position against the internal surface of the drum. These ribs do not extend inwardly to the shaft so that the pockets between the adjacent ribs open into each other for permitting the material to drop from one pocket to the other as the drum rotates and thus becomes thoroughly mixed.

The material by which the blocks or tiles are formed is supplied from a hopper D arranged at the top of the frame A above the upper drum, and this hopper is divided into two compartments 14 and 15 for receiving, respectively, sand and cement. The lower end of the hopper is formed into a chute 16 as clearly shown in Fig. 4. At the point of connection between the hopper and the chute is a measuring device 17, such device being in the form of a rotary member having pockets 18 which are adapted to receive the material from the hopper and discharge it into the chute as the member rotates. The member has its outer journals extending through the opposite walls of the chute 16, and these journals are provided with ratchet wheels 19, and coöperating with each is a pawl 20 whereby the measuring member 17 can be rotated in a step by step manner. The pawls 20 are mounted each on a bell crank lever 21 fulcrumed to the extended journal 22 of the adjacent measuring element 17, and these levers are operated by suitable mechanism deriving power from the main shaft or other suitable part of the machine. In the present instance, the shaft 3 of the upper drum is provided at one end with a crank arm 23, Fig. 1, to which are connected oppositely extending rods or links 24 that are in turn connected with bell crank levers 25, fulcrumed at 26 on the supporting frame and these bell crank levers are connected by rods 26 to the pawl carrying levers 21. By this arrangement, the rotation of the crank arm 23 causes the bell crank levers 25 to oscillate so that the pawl carrying levers 21 will also oscillate and move the measuring elements 17 step by step for proportioning the material fed from both of the hoppers to the upper mixing drum. It is preferable to provide adjusting means whereby the proportion of sand and cement can be varied at will and for this purpose the adjustment shown in Fig. 5 is provided. Each pawl carrying lever 21 is provided with a screw 27 threaded at 28 in the outer end of the lever, and on the screw is a block 29 that moves back and forth in a slot 30 in the lever and the upper end of the connecting rod 26 is pivotally connected at 31 with the said block. By turning the hand wheel 32 on the outer end of the screw the block 29 can be moved toward or away from the center 22 to vary the throw of the pawl carrying lever, and hence regulate the range of movement of the feed measuring device 17. It will thus be seen that the proportion of one material to the other can be adjusted to a nicety.

The sand and cement are mixed in a dry state in the upper drum B and the material is conducted from the upper to the lower drum through a chute E at the side of the machine opposite the chute 16. As shown in Fig. 6, the upper end of the chute E is formed into an expanded mouth 33 into which the material is delivered from the upper drum. The lower portion of the chute E has a laterally-discharging opening 34 which communicates with the lower drum, through the opening 12 therein. The partially mixed material is moistened while passing through the chute E by water sprayed into the chute through a spraying device 35 that enters the top of the chute through an opening 36, Fig. 2. The nozzle or rose is attached to a supply pipe 37 arranged at one side of the machine and connected with a source of supply pipe, and in this pipe is a hand controlled valve 38 whereby the supply of water can be adjusted.

The supply of water is adapted to be controlled in proportion to the quantity of material passing from one mixing drum to the other so that a uniform consistency of the plastic material can be maintained. The chute E is mounted in such a manner as to rise and fall, and this movement controls a valve 39 in the pipe 37, so that as the said chute lowers with an increasing supply of material, the valve will open to a greater extent to admit more water, and the operation is reversed when the weight of the material within the chute diminishes. The chute is mounted on links or arms 40 arranged at the sides of the frame and which are secured to horizontally disposed rock shafts 41 mounted in bearings 42 on the main frame. On the other end of the upper rack shaft 41 is a crank arm 43 which carries an adjustable weight 44. The weight 44 is adapted to counterbalance the weight of the chute E and the arm 43 is connected by an arm 45 with a handle 46 upon the controlling valve 39. It will thus be seen that the vertical movement of the chute 3 causes the valve 39 to open or close to vary the supply of water in accordance with the amount of material passing through the chute.

The moistened material becomes thoroughly mixed in the lower drum C and is churned over and over again as the drum rotates, and the material thus mixed passes out of the larger end of the drum upon an inclined chute 47 supported in a fixed position on the frame A at a point under the drum and the lower end of this chute is adapted to be disposed over a suitable feed box which conducts the material periodically to the mold.

From the above description, taken in connection with the accompanying drawings the advantages of the construction and of the method of operation will be readily apparent to those skilled in the art to which the invention appertains, and while I have described the principles of operation of the invention, together with the apparatus which I now consider to be the best embodiment thereof, I desire to have it understood that the apparatus shown is merely illustrative, and that such changes may be made when desired as are within the scope of the claims appended hereto.

Having thus fully described the invention what is claimed as new is:

1. In combination with a plurality of simultaneously actuated mixing members disposed one above the other and a frame for said members, of a slidable chute for conducting material from the upper to the lower member, a rock shaft upon the frame, links upon the rock shaft connected with the chute a weight upon the rock shaft, a water supply pipe communicating with the chute, a valve for the pipe, a handle for the valve, and a link connecting the handle and the rock shaft.

2. In combination with a frame provided with mixing members one disposed above the other, of a chute having open ends communicating with both of the mixing members, a rock shaft mounted on said frame, connections rigidly secured to the rock shaft and pivoted to the chute, a crank arm upon the rock shaft, an adjustable weight upon the crank arm, a water supply pipe communicating with the chute, a rose upon the end of the water pipe within the chute, a valve for the water pipe, a handle for the valve, and a link connecting the handle with the crank arm.

In testimony whereof I affix my signature in presence of two witnesses.

GUSTAV HOFFMANN.

Witnesses:
A. MUELLER,
CARL T. EKSTRAND.